United States Patent [19]
Takahashi et al.

[11] Patent Number: 6,005,587
[45] Date of Patent: Dec. 21, 1999

[54] METHOD AND APPARATUS FOR IMAGE MAGNIFICATION CORRECTION

[75] Inventors: Hirokazu Takahashi, Yokohama; Tadashi Suzuki, Tokyo; Satoru Kutsuwada, Yokohama; Satoshi Kaneko, Kawasaki; Hidehiko Asai, Kawasaki; Masahiko Tominaga, Kawasaki; Noriaki Matsui; Hiroyuki Kimura, both of Yokohama, all of Japan

[73] Assignee: Canon Kabushiki Kaisha, Tokyo, Japan

[21] Appl. No.: 08/590,817

[22] Filed: Jan. 24, 1996

[30] Foreign Application Priority Data

Jan. 24, 1995 [JP] Japan .................................. 7-027572

[51] Int. Cl.⁶ .................................................. G06T 3/00
[52] U.S. Cl. ............................................................ 345/439
[58] Field of Search ................................ 395/133, 139, 395/779–782; 358/448–453; 355/50, 55, 61, 62, 63; 250/208.1; 399/42; 235/436

[56] References Cited

U.S. PATENT DOCUMENTS

| | | | |
|---|---|---|---|
| 4,951,158 | 8/1990 | Ichitani | 358/451 |
| 4,961,090 | 10/1990 | Gray, Jr. et al. | 355/50 |
| 5,130,525 | 7/1992 | Ryon | 250/208.1 |

*Primary Examiner*—Almis R. Jankus
*Attorney, Agent, or Firm*—Fitzpatrick Cella Harper & Scinto

[57] ABSTRACT

An image processing apparatus has an adjusting mode which enables determination of a magnification correction value. A predetermined image on a test chart placed on an original table or an image of a chart fixed outside the valid image area are read, and the proper correction value for compensating for any variation in the image magnitude within a scanning system is computed based on the results of reading the test chart image. Subsequently, a printing system is operated to print test chart data read from a memory and the image printed in accordance with the test chart data is read by the scanner system which has been corrected, the result of the reading being used in computing the magnification correction value for compensating for any magnification variation occurring in the printer system.

26 Claims, 12 Drawing Sheets

| FIG. 2A | FIG. 2B |

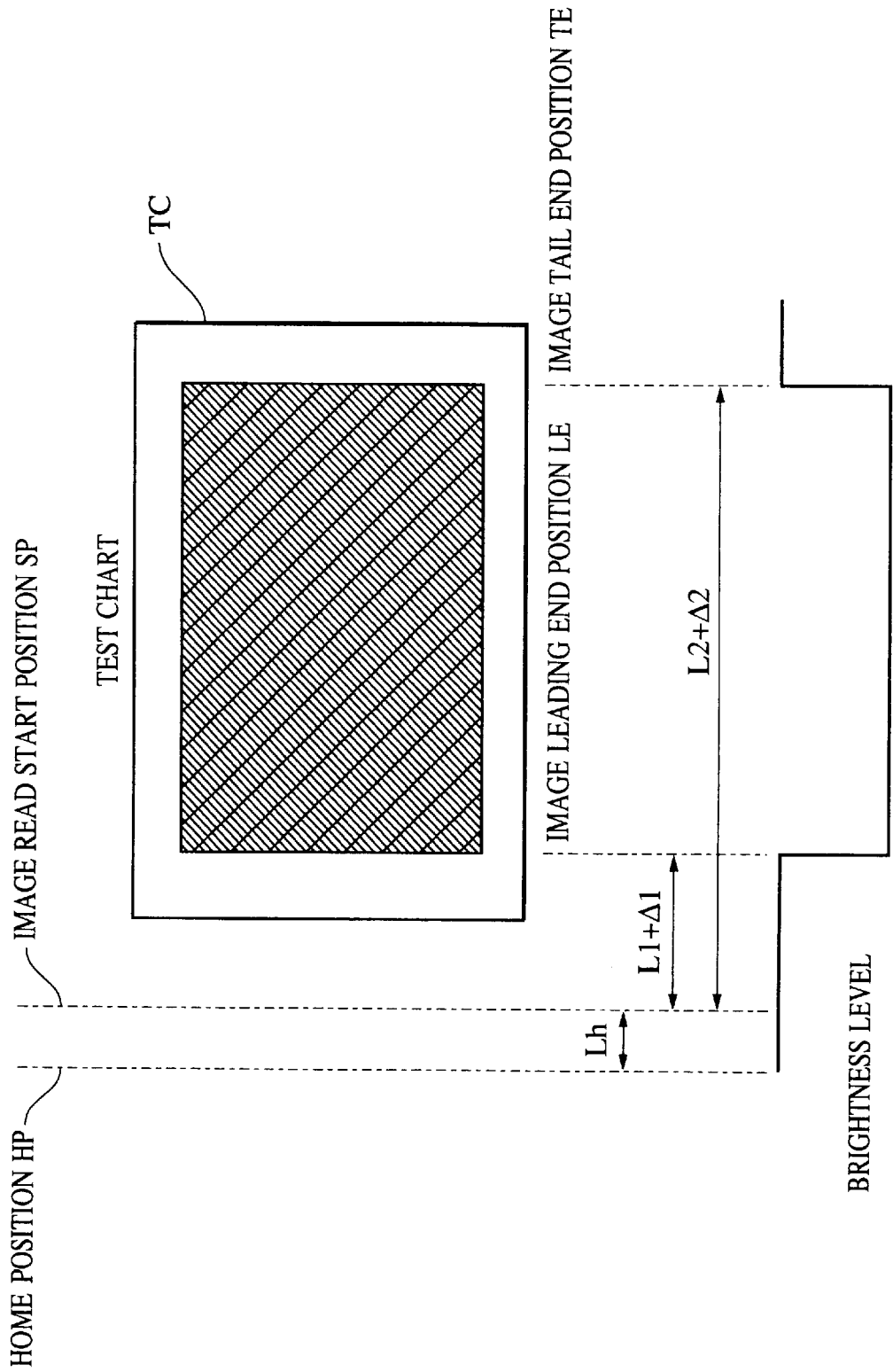

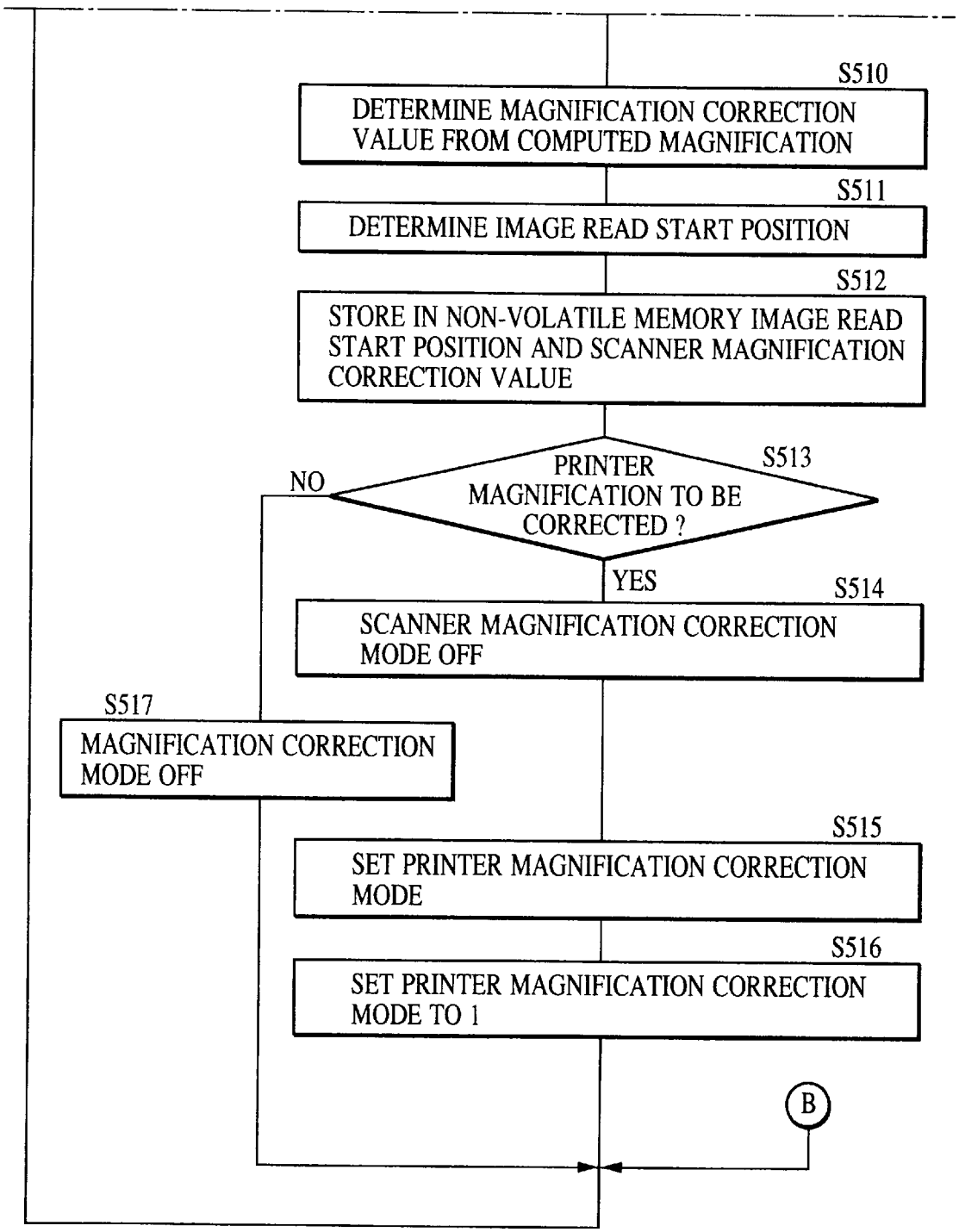

METHOD AND APPARATUS FOR IMAGE MAGNIFICATION CORRECTION

BACKGROUND OF THE INVENTION

1. Field of the Invention

The present invention relates to an image processing apparatus, as well as to an image processing method, which performs correction of image magnification in an image handling apparatus such as an image reader which reads an image of an original document, a printer which records an image, a copying machine which copies an image of an original document, and so forth.

2. Description of the Related Art

FIG. 9 shows the construction of a known copying machine, in particular constructions of a reader section 920 and a printer section 921 of the copying machine. Original document sheets stacked on an original document feeder 901 are fed one by one onto a glass plate 902 of an original table, in response to a reading demand generated in the reader section 920 for reading the images on original document sheets. When a sheet of the original document is placed at the right position on the glass plate 902, a lamp 903 of a scanner unit 904 is lit, and the scanner unit 902 starts to move in synchronization with supply of a reading signal to a CCD image sensor 909, thereby illuminating the image on the original document sheet.

The light reflected by the original image impinges upon the CCD image sensor 909 via mirrors 905, 906 and 907 and a lens 908. The CCD image sensor 909 has arrayed thousands of photoelectric conversion cells which constitute pixels, and the light signals thus received by the CCD image sensor are converted into electrical signals on a pixel basis (i.e., each pixel produces its own signal). The electrical image signals thus obtained are subjected to an image processing operation and signals obtained through the image processing operation are sent to the printer section 921.

The image signals delivered to the printer section 921 are converted by an exposure control unit 910 into modulated light signals (a laser beam of modulated intensity in FIG. 9) which irradiate a photosensitive member 911 which has been electrostatically charged, thereby forming an electrostatic latent image on the photosensitive member 911. Then, the latent image is developed as the surface of the photosensitive member 911 moves through a developing unit 912. A transfer sheet is fed from a transfer sheet stacker 913 or 914 in timing with the movement of the leading end of the developed image, and when both the developed image and the transfer sheet pass a transfer unit 915, the developed image is transferred to the transfer sheet.

The transferred image is then fixed to the transfer sheet as the latter moves through a fixing unit 916, and the sheet carrying the image fixed thereon is ejected from the machine by means of a sheet ejecting unit 917. The transfer sheets thus ejected successively are distributed to different bins of a sorter (when a sorting function is used). If such a function is not available or not used, the transfer sheets having the fixed images are stacked on a tray or on an uppermost or a selected bin of the sorter.

A copying machine of the kind described has an enlarging/reducing function, i.e., a function for varying the size of the copy image with respect to the size of the original image. A change of magnification in the direction of main scanning is achieved through an electrical image processing effected on the signals input through the CCD image sensor 909, while a change of magnification in the direction of sub-scanning is achieved by varying the ratio between the peripheral velocity of the surface of the photosensitive member in the form of a drum and the velocity of movement of the scanner unit 904, typically by varying the moving velocity of the scanner unit 904, whereby a copy image of a desired magnification is obtained.

The described arrangement suffers from a problem in that the image reading position is progressively changed in accordance with the movement of the scanner unit 904, so as to undesirably change the image reading magnification, when any deviation of the optical axis occurs in the optical unit including the scanner unit 904 and the CCD image sensor 909 and the optical elements disposed therebetween.

FIGS. 10 and 11 illustrate the manner in which a shift of the optical axis occurs due to movement of the optical system during scanning of the original document image.

In these Figures, a unit 1 is a scanner unit which actually scans the original document image, while a unit 2 is a unit which functions to maintain a constant length of optical path between the point on the original document which is being scanned and the CCD image sensor 909. Any deviation of the mounting angle of a mirror B attached to the unit 2 from the correct angle causes the distance between the unit 1 and the unit 2 to increase in accordance with the movement of the unit 1 in the direction of the arrow away from the scanning start position, resulting in a shift of the optical axis.

The shift of the optical axis causes the inputted image to be contracted when the direction of the shift is the same as the direction of the scanning movement of the scanner unit, whereas, when the shift of the optical axis occurs in the direction opposite to the direction of movement of the scanner unit, the result is that the inputted image is enlarged. A further increase in the deviation of the optical axis causes the path of light leading back from the CCD image sensor 909 to fall out of the area of the optical mirror A, so that the original image cannot be received by the CCD image sensor 909. Consequently, no effective image signal is delivered by the CCD image sensor 909 which serves as the image reading sensor.

Hitherto, it has been necessary to adjust, with high degrees of precision, the positions of the mirrors 905, 906 and 907, as well as the position of the lens 908, in order to minimize the undesirable change in magnitude attributable to a shift of the optical axis.

Replacement of one or more of these optical elements due to, for example, damage of such elements inevitably necessitates not only fine adjustment of the replaced elements but also fine readjustment of other elements. Service engineers are therefore obliged always to carry tools and jigs which are necessary for such fine adjustment. Alternatively, the whole copy machine has to be sent to a service station where skilled engineers and tools/jigs are available, and is sent back to and reinstalled in the user's office after completion of adjustment at such a service station. This heavily burdens personnel involved in service and maintenance, and causes inconvenience to the users.

In order to overcome these problems, a method employing a non-volatile memory means such as a battery-backed-up memory has been proposed as an alternative to the conventional method employing fine readjustment of positions of optical elements such as mirrors and lens. More specifically, according to the alternative method, magnification correction values which have been obtained beforehand are stored in the non-volatile memory means and, when an original document image is scanned by a scanner at a designated magnification, the velocity of the scanner is controlled taking into account the correction value read from the memory means, whereby a correction of magnification of the read image is performed. This correction is carried out to compensate not only for error or change in the magnification taking place in the scanner system but also for error or change in magnification occurring in the printer system. In other words, correction for the scanner system and correction for the printer system are performed in a consolidated manner.

Current development in digital technology has brought about copying machines of the type in which a scanner section and a printer section are operable independently of each other. In order to effect the above-described correction in this type of copying machines, it is necessary to determine the magnification correction values for the scanner section and the printer section, respectively, and to store them in non-volatile memory means. Consequently, it is necessary to prepare and use tools and jigs for determining the magnification correction values for the scanner section and for the printer section, separately, which makes the work further complicated.

SUMMARY OF THE INVENTION

Accordingly, it is an object of the present invention to provide an image processing apparatus, as well as a method, which ensures that reading of an image or recording of an image can be performed exactly at the designated magnification.

Another object of the present invention is to provide an image processing apparatus, as well as a method, which permits easy correction of magnification in reading or recording an image, without requiring use of any specific jigs and tools.

Still another object of the present invention is to provide an image processing apparatus, as well as a method, which is suitable for use in a multi-function apparatus having a scanner function, printer function and copying function and which permits correction of image magnitude for each of these functions.

To these ends, according to one aspect of the present invention, there is provided an image processing apparatus, comprising: reading means for reading an original image; magnification detecting means for detecting the image reading magnification of the reading means based on image signals obtained through reading of a predetermined image by the reading means; and correcting means for correcting, in accordance with the image reading magnification detected by the magnification detecting means, the image reading magnification of the reading means.

The present invention in another aspect provides an image processing method comprising: a reading step for reading a predetermined image; a detecting step for detecting an image reading magnification based on image signals obtained in the reading step; and a correcting step for correcting the magnification of reading of an original image in accordance with the image reading magnification detected in the detecting step.

The present invention in still another aspect provides an image processing apparatus, comprising: recording means for recording an image in accordance with image signals; detecting means for detecting the image recording magnification based on a predetermined record image recorded by the recording means; and correcting means for correcting, based on the image recording magnification detected by the detecting means, the image recording magnification of the recording means.

The present invention in a further aspect provides an image processing method comprising: a recording step in which a predetermined image is recorded in accordance with image signals; a detecting step in which an image recording magnification is detected based on the recorded predetermined image; and a correcting step in which the image recording magnification is corrected based on the detected image recording magnification.

The present invention in a further aspect provides an image processing apparatus, comprising: reading means for reading an original image; recording means for recording the read original image based on image signals obtained through reading of the original image by the reading means; magnification detecting means for detecting an image magnification based on image signals obtained through reading of a predetermined image by the reading means and based also on a predetermined image recorded by the recording means; and correcting means for correcting, based on the image magnification, the image reading magnification of the reading means and/or the image recording magnification of the image recording means.

The present invention in a further aspect provides an image processing method comprising: a first step of reading a first predetermined image; a second step of detecting an image reading magnification based on read signals obtained through reading of the first predetermined image; a third step of recording a second predetermined image; a fourth step of reading the recorded second predetermined image; a fifth step of detecting an image recording magnification based on read signals obtained through reading of the second predetermined image; and a sixth step of correcting the image reading magnification and/or the image recording magnification in accordance with the detected image reading magnification and/or the detected image recording magnification.

These and other objects, features and advantages of the present invention will become clear from the following description of the preferred embodiments when the same is read in conjunction with the accompanying drawings.

BRIEF DESCRIPTION OF THE DRAWINGS

FIG. 3 is an illustration of a magnification correction test chart used in the copying machine shown in FIG. 1;

FIGS. 4A–4B and 5 are flow charts showing a magnification correcting operation performed by the copying machine shown in FIG. 1;

DESCRIPTION OF THE PREFERRED EMBODIMENT

Figure 1:
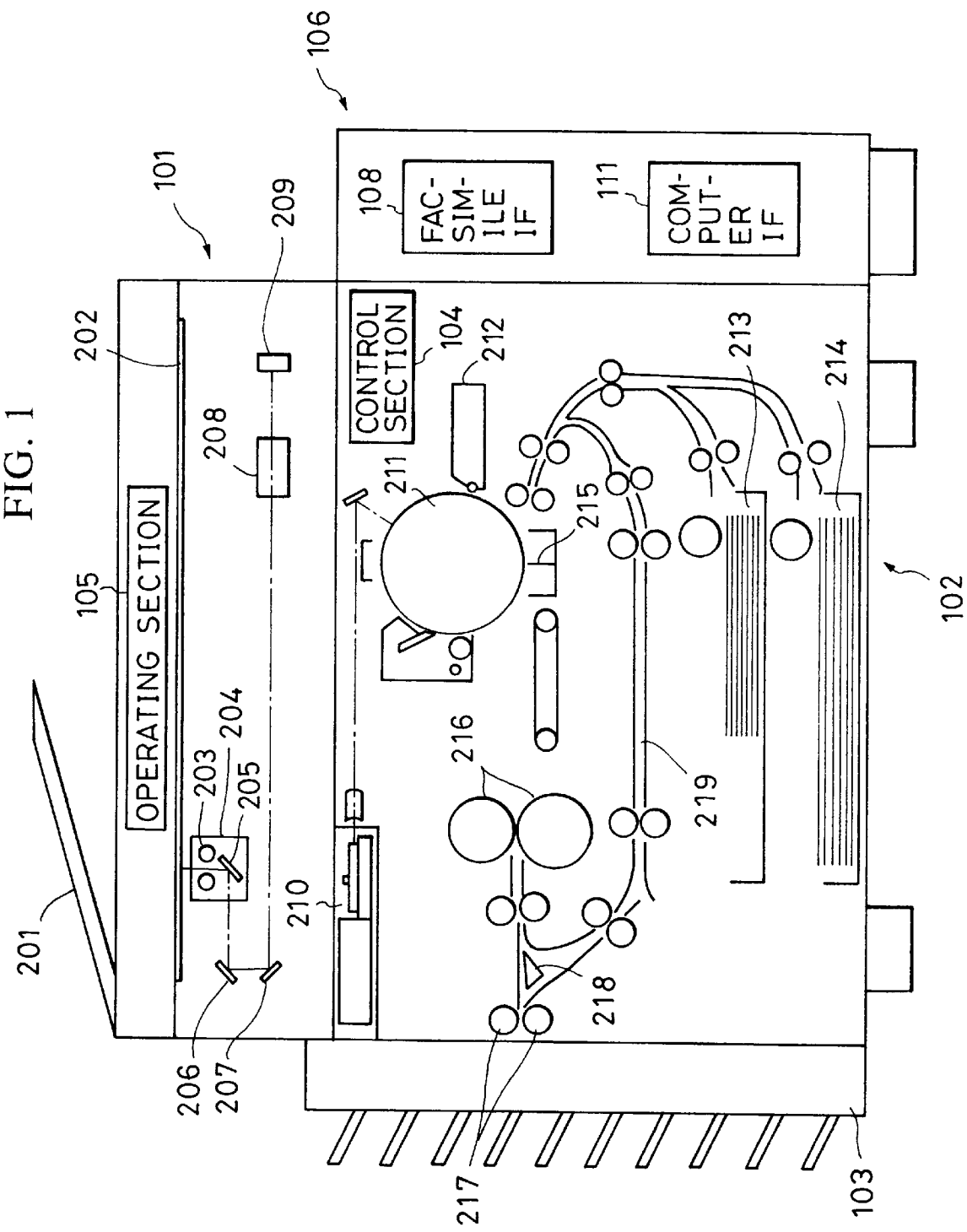
FIG. 1 is a schematic illustration showing the construction of a copying machine incorporating the present invention.

FIG. 1 shows the construction of a multi-function digital copying machine to which the present invention is applied.

The copying machine has the following sections: an image input device (referred to as a "reader section", hereinafter) 101 which converts an image on an original document sheet into image data; an image output device (referred to as a "printer section", hereinafter) 102 which has a plurality of types of transfer sheet cassettes and outputs the image data onto a transfer paper sheet fed from one of the cassettes in accordance with a printing instruction; a sorter section 103 which sorts successive printed transfer paper sheets delivered by the printer section 102; a control section 104 which controls operations of the reader section 101, printer section 102 and the sorter section 103; an operating section 105 which includes an input unit which enables selection of an operation mode or function such as one of copying mode, facsimile mode and so on and a display unit which enables an operator to confirm the operation mode and other conditions set on the machine; and an interface device 106 which is electrically connected to the control section 104.

The interface device 106 has a facsimile interface 108 which transmits image signals from the reader section 101 to an external communication line or receives image signals coming through the external communication line. The interface device 106 also has a computer interface 111 which interconnects the multi-function copying machine to an external device such as a personal computer, wordprocessor or the like so as to enable exchange of picture signals between the multi-function copying machine and the external device.

Referring to FIG. 1, original document sheets stacked on an original document feeder 201 are fed one by one onto a glass sheet 202 of an original table, in response to a reading demand for reading the images on original document sheets. When a sheet of the original document is placed at the right position on the glass plate 202, a lamp 203 of a scanner unit 204 is lit, and the scanner unit 202 starts to move at a velocity corresponding to a selected magnification in synchronization with supply of a reading signal to a CCD image sensor 209, thereby illuminating the image on the original document sheet, thus performing sub-scanning of the original image.

The light reflected by the original image impinges upon the CCD image sensor 209 via mirrors 205, 206 and 207 and a lens 208. The CCD image sensor 209 has arrayed thousands of photoelectric conversion cells constituting pixels, and the light signals thus received by the CCD image sensor are converted into electrical signals on pixel basis (i.e., each pixel produces its own signal). The electrical image signals thus obtained are subjected to an image processing operation, and signals obtained through the image processing operation are sent to the printer section 102.

The image signals delivered to the printer section 102 are converted by an exposure control unit 210 into modulated light signals (in this embodiment, a laser beam of modulated intensity) which irradiate a photosensitive member 211 which has been electrostatically charged, thereby forming an electrostatic latent image on the photosensitive member 211. Then, the latent image is developed as the surface of the photosensitive member 211 moves through a developing unit 212. A transfer sheet is fed from a transfer sheet stacker 213 or 214 in timing with the movement of the leading end of the developed image, and when both the developed image and the transfer sheet pass a transfer unit 215, the developed image is transferred to the transfer sheet.

The transferred image is then fixed to the transfer sheet as the latter moves through a fixing unit 216, and the sheet carrying the image fixed thereon is ejected from the machine by means of a sheet ejecting unit 217. The transfer sheets thus ejected successively are distributed to different bins (when a sorting function is used). If such a function is not available or not used, the transfer sheets having the fixed images are stacked on a tray or on an uppermost or a selected bin of a sorter.

A description will now be given of an operation in which two successively read images are printed on both sides of a single transfer paper sheet.

The transfer paper sheet which carries on one side an image fixed through the fixing unit 216 and which has been conveyed to the sheet ejecting unit 217 is then reversed by a turning member 218 which reverses the conveying direction so as to turn and direct the transfer paper sheet to a sheet re-feed stacker 219.

The subsequent original document sheet is placed and read in the same way as that for the first sheet described above. In this case, however, the feed of the transfer paper sheet is conducted from the sheet re-feed stacker 219 rather than from the stacker 213 or 214, so that two successively read images are printed on obverse and reverse sides of a single transfer paper sheet.

Figures 2, 2A:
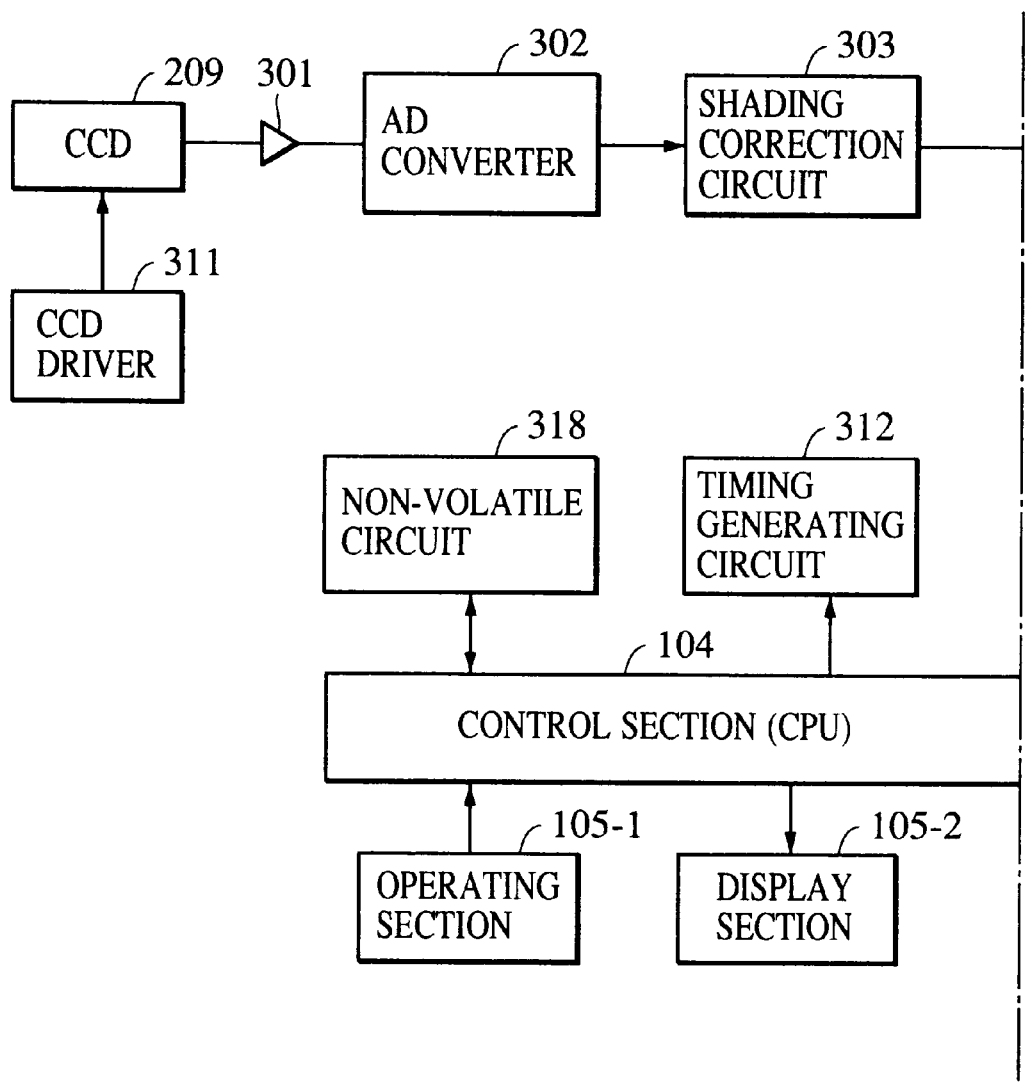
FIGS. 2A–2B are block diagrams showing the construction of an image signal processing unit incorporated in the copying machine shown in FIG. 1.
Figure 2B:
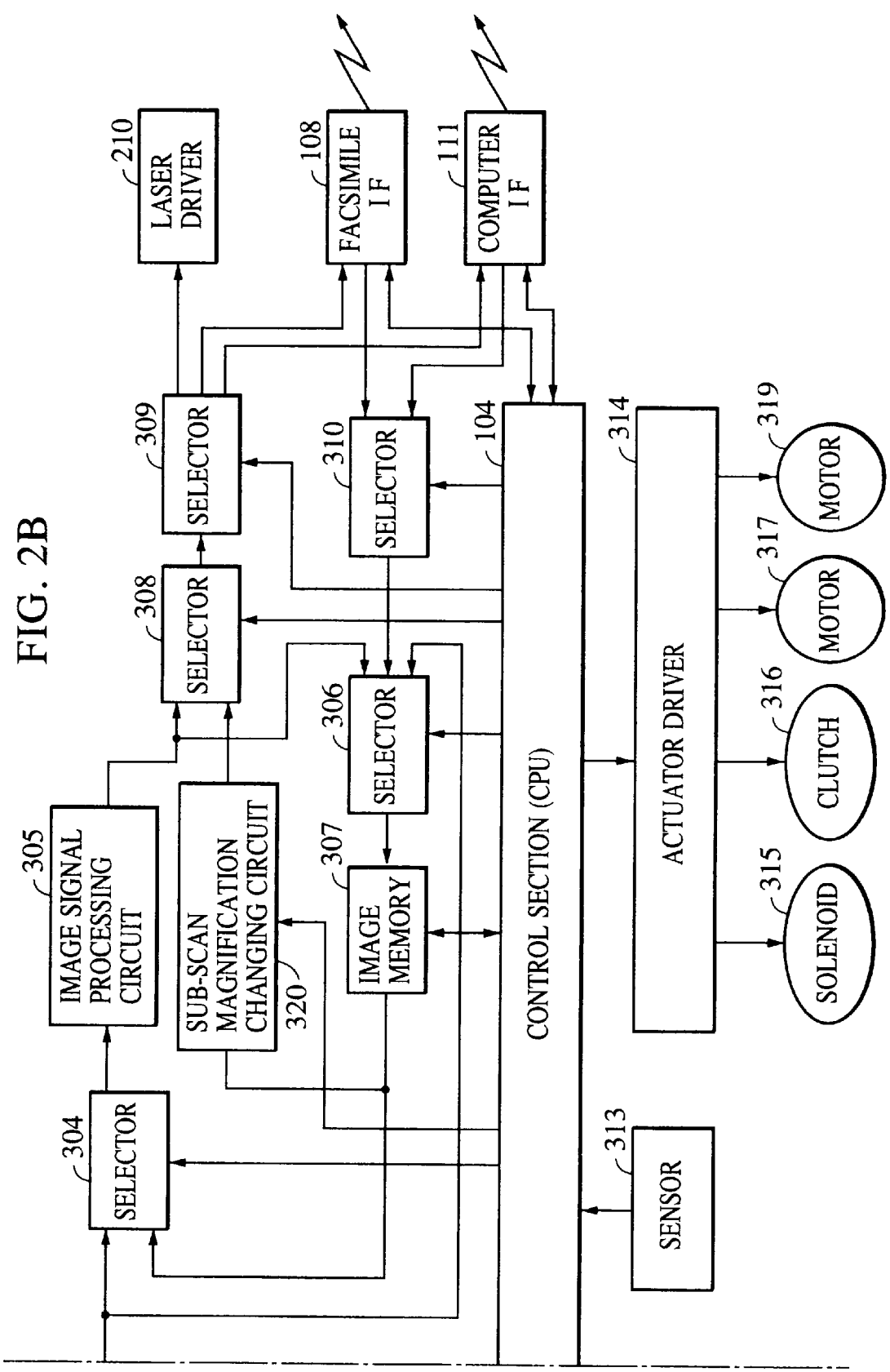

FIG. 2 is a block diagram showing the construction of an image signal processing circuit used in the copying machine of FIG. 1.

The light reflected from the original image is converted into an electrical signal by each photoelectric conversion cell of the CCD 209 and is stored therein in the form of electric charge. As stated before, the CCD image sensor 209 has arrayed thousands of photoelectric conversion cells which are arranged on three lines corresponding to R, G and B or C, M and Y, in order to provide RGB or CMY color information. The charges stored in the cells of the CCD image sensor 209 are successively read in accordance with reading signals supplied from a CCD driver 311, whereby analog signals corresponding to the original image are obtained for each of the image lines.

After the reading of the charges of an image line from the cells, the cells are reset to clear the charges stored therein and storage of charges corresponding to subsequent original image signals is commenced. The analog signals read from the CCD 209 are amplified by a pre-amplifier 301 to a level which matches the level of signals to be input to an A/D converter 302. Output signals from the A/D converter 302 are input to a shading correction circuit 303 which performs a correction to compensate for any shading distortion which is attributable to unevenness of light distribution of the lamp 203 and non-uniform sensitivity distribution of the CCD image sensor 209.

The signals which have passed the shading correction circuit 303 are delivered to a selector 304 and another selector 306. The selector 304 selects, in accordance with instructions input from the control section 104, one out of two kinds of signals, i.e., the signal input from the shading correction circuit 303 and the signal read from the image memory 307, and delivers the selected signal to the image signal processing circuit 305.

The image signal processing circuit 305 operates to change and control the magnification of the image signal inputted thereto, in the direction of the main scan. This circuit 305 also conducts as necessitated various other processings such as repeating processing, edge stressing processing using a spatial filter, and marker area determining processing (determination is conducted based on brightness level in a monochromatic system and based on the levels of color signals in a color system. The circuit 305 further conducts, as required, various editorial processings including patterning, thickening, masking and trimming. In accordance with instructions given by the control section 104, a sub-scan magnification changing circuit 320 performs a magnification changing operation on the signals read from the image memory 307, so as to change the magnification of the image in the direction of the sub-scanning.

Signals processed by the image signal processing circuit 305 are delivered to the above-mentioned selector 306 and also to still another selector 308. The selector 308 operates to select, in accordance with instructions given by the control section 104, one out of two kinds of signals: the signal delivered by the image signal processing circuit 305 and the signal read from the image memory 307 and processed through the sub-scan magnification changing circuit 320, and delivers the selected signal to a selector 309.

The selector 309 operates under the control of the control section 104 so as to direct the delivered signal to one of a laser driver 210 which functions as the aforementioned exposure control unit in the printer section 102, a transmitting section of a facsimile interface 108, and a computer interface 111.

A selector 310 also operates under the control of the control section 104 so as to select either one of a signal received through the facsimile interface 108 and a signal derived from the computer interface 111. The aforementioned selector 306 operates in accordance with instructions given by the control section 104 so as to select one of the signal from the image signal processing circuit 305, the signal from the shading correction circuit 303, and the signal from the selector 310, and delivers the selected signal to the image memory 307 so that the selected signal is stored in the image memory 307.

The control section 104 controls, through an actuator driver 314, operations of various actuators and transmission systems such as a motor 317 which moves the scanner unit 204, a motor 319 for feeding the transfer paper sheet, a clutch 316 and a solenoid 315, thus performing the control of whole system and functions including the feed of the transfer paper sheets, image formation and sheet ejection, as well as the control of the optical system for exposing and scanning the original document sheet, in accordance with signals derived from various sensors 313. Connected to the control section 104 is a non-volatile memory 318, e.g., battery-backed-up RAM, which stores data peculiar to the copying machine including test pattern data to be used in later-mentioned printer magnification correcting operation, actuator operating conditions and so forth.

The control section 104 also picks up the operation mode set through the operating section 105-1 of the operating/display section 105, as well as various operation demands entered through the operating section 105-1, and delivers such mode and demands to the display section 105-2 so that they are displayed on the display section 105-2.

The control section 104 further operates to control a timing generating circuit 312 which delivers operation timing signals to various sections and units.

Figure 4A:
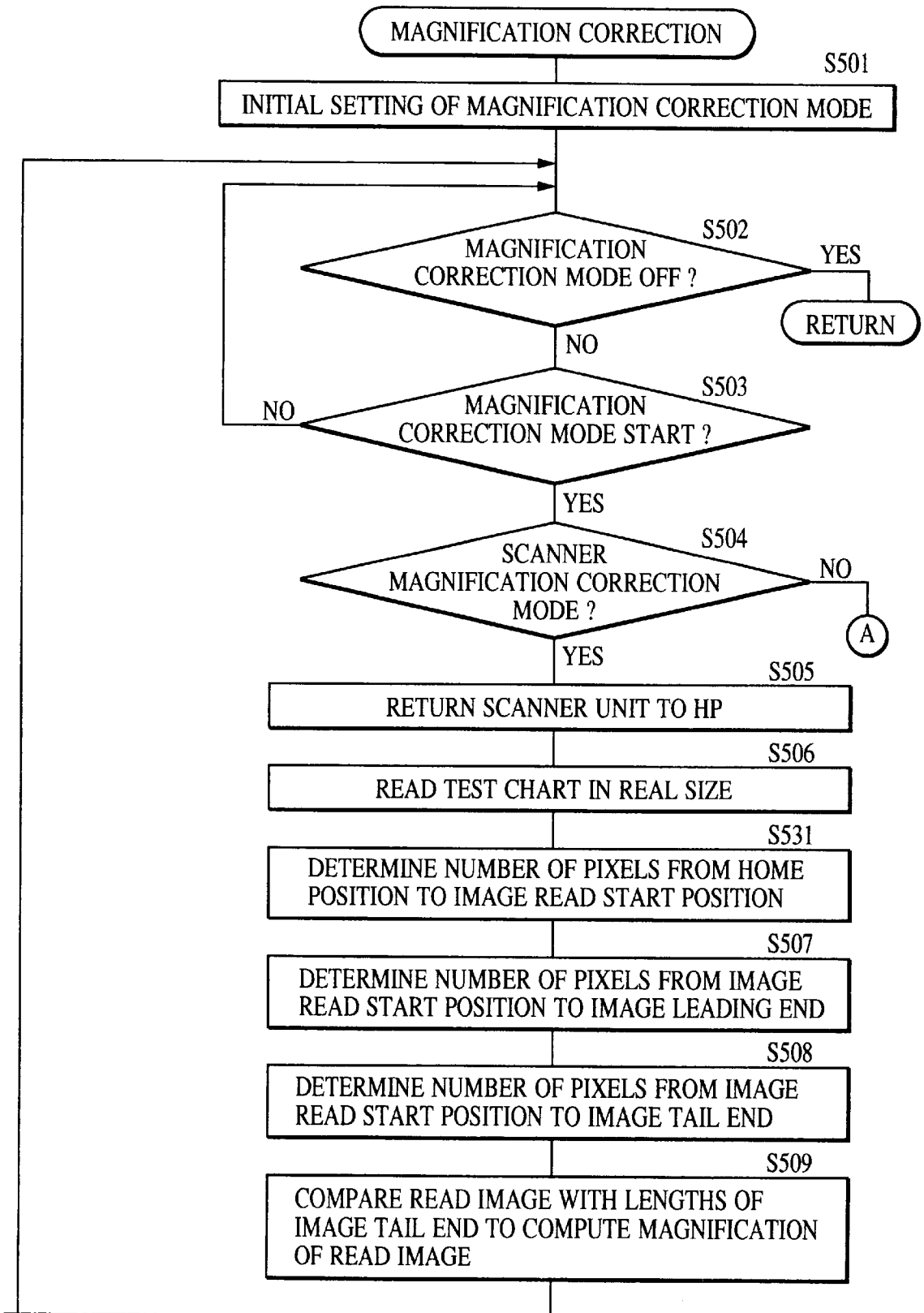
Figure 5:
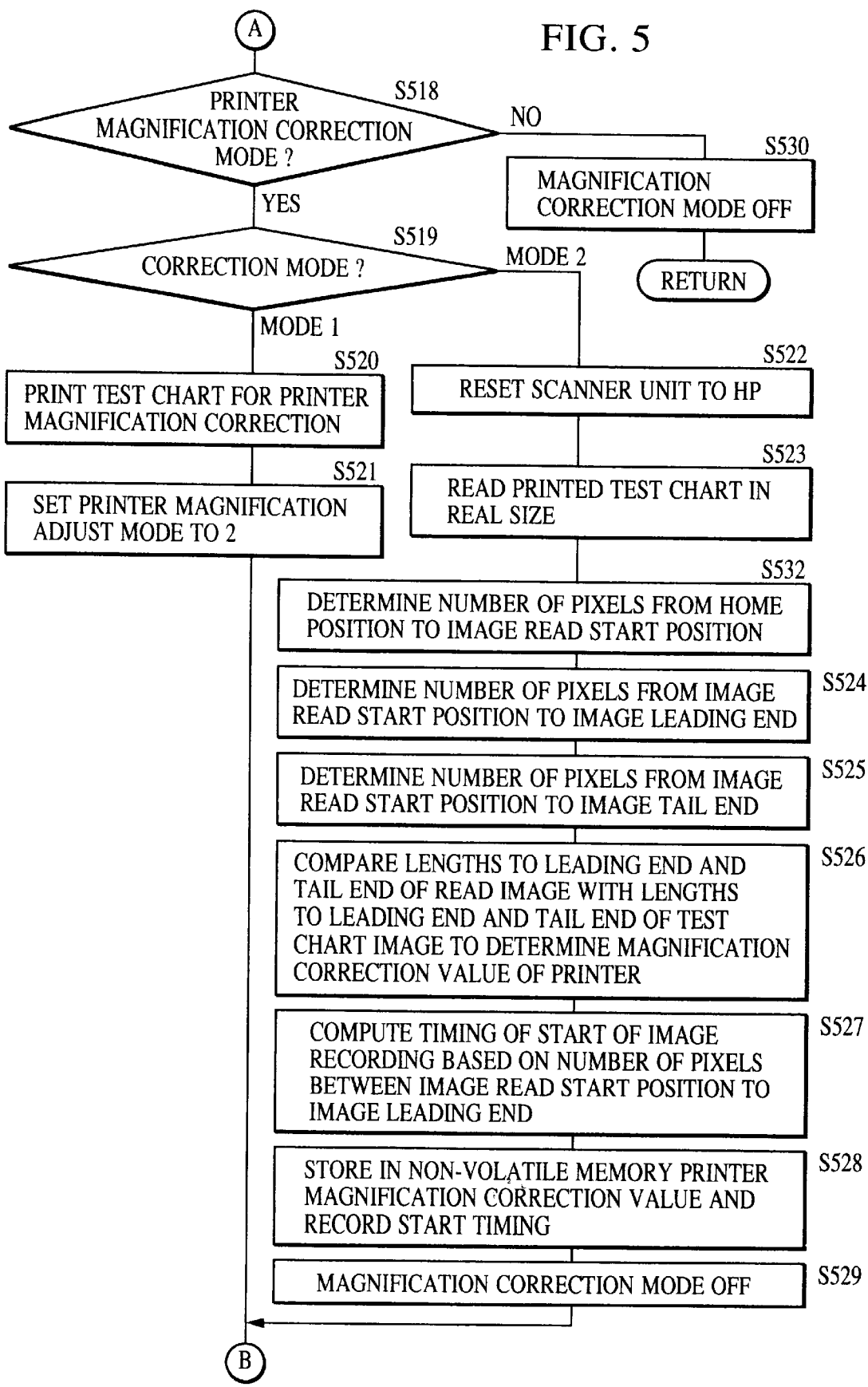

A description will now be given of the magnification correcting operation, with specific reference to FIGS. 4 and 5, which are flow charts illustrative of the process performed by the control section 104 for computing magnification correction values.

The user operates the operating/display section 105 so as to set the operation of the multi-copying machine to a magnification correcting mode. In response to this instruction, the control section 104 sets the operation to a scanner magnification correcting mode, by initializing various constants and actuating modes in Step S501. In Step S502, if the magnification correction mode is not turned off, the process proceeds to Step S503, waiting for a correction start instruction which is to be given through the operating/display section 105. When such an instruction is received in Step S503, the process advances to Step S504, which inquires whether the scanner magnification correction mode has been selected. If the answer is YES, i.e., if the scanner magnification correction mode has been selected, the process advances to Step S505, in which the scanner unit 204 is returned to the home position (HP). In a subsequent step Step S506, a test chart TC placed on the glass plate 202 of the original table is read in real size and the image thus read is stored in the image memory 307.

As shown in FIG. 3, the test chart TC carries an image that is solid black, or a monochromatic image or a patterned image which is sufficiently discriminatable from the under-color or background color, starting from a position which is a predetermined distance spaced from an end of the original in the direction of the sub-scanning. The size of the test chart TC has been selected to be equal to the maximum size which can be scanned by the scanner unit 204 in the direction of the sub-scanning so as to minimize any error of the magnification correcting value which is to be obtained.

A plurality of types of such a test chart TC are prepared and inputted for selection through the operating/display section 105. When one of the test charts TC is selected, data concerning the positions of leading and tail ends of the image carried by the selected test chart TC is set in the control section 104.

More specifically, when a test chart TC having a monochromatic pattern image has been selected, the control section 104 determines, based on the image stored in the image memory 307, the positions of points where the level of brightness changes, in the direction of reading of the image, i.e., in the sub-scanning direction, thereby determining the distances or lengths in terms of the number of pixels, such as the number Lh of pixels from the home position HP to the image reading start position SP (Step S531), the number (L1+Δ1) pixels from the image reading start position SP to the leading end LE of the image (S507), and the number (L2+Δ2) of pixels from the reading start position SP to the tail end TE of the image (S508). The control section 104 then reads the pixel numbers L1 and L2 between the image reading start position SP and the leading and tail ends LE and TE of the image which have been set beforehand in accordance with the selected test chart TC, and compares these numbers L1, L2 with the pixel numbers (L1+Δ1), (L2+Δ2) determined in Steps S507 and S508, thereby determining the image reading magnification M by executing the following computation(S509):

$$M = \{(L2 + \Delta 2) - (L1 + \Delta 1)\} / (L2 - L1)$$
$$= 1 + (\Delta 2 - \Delta 1)/(L2 - L1)$$

The term corresponding to the difference between the real image size and the read image size, represented by (Δ2−Δ1)/(L2−L1), is then set as the magnification correction value m, in Step S510.

The process then advances to Step S511, which executes the following computation so as to determine the image reading start position, based on the pixel number L1 between the image reading start position SP and the image leading end position LE which has been set beforehand in accordance with the selected test chart TC and based also on the image reading magnification as determined in Step S509.

More specifically, representing by Δ3 the correction value for correcting the image reading start position SP in terms of number of pixels, using the image leading end position LE as a reference, a condition L1×M=L1+Δ3 is established, so that the correction value Δ3 is determined as follows:

$$\Delta 3 = L1 \times (M-1)$$

The number of pixels from the home position to the image reading start position SP, represented by PN, is therefore expressed by PN=Lh+(Δ1−Δ3) and, therefore, determined as follows:

$$PN = Lh + (L2 \times \Delta 1 - L1 \times \Delta 2)/(L2 - L1)$$

The image reading start position is thus determined in terms of the pixel number PN.

The sub-scan direction magnification correction value m as determined in Step S510 and the pixel number PN indicating the image reading start position as determined in S511 are stored in the non-volatile memory 318 in Step S512.

When a magnification correction is to be conducted to compensate any magnification variation occurring in the printer, an answer YES is given in Step S513, so that Steps S514 to S516 are executed so as to turn of the scanner magnification correcting mode and to set the printer magnification correction mode to "1". When the magnification correction for the printer is not needed, an answer NO is given in Step S513, so that the magnification correction mode is canceled in Step S517, and the process returns to Step S502 to commence the stand-by loop operation.

When the magnification correction mode has been started (S503) and if the printer magnification correction mode has been set to the "mode 1" through Steps S504, S518 and S519, the process proceeds to Step S520, in which the control section 104 operates to read printer correction test chart data which has been stored in the non-volatile memory 318 and the read test chart data is printed on a transfer paper sheet. Then, the control section 104 operates to set to mode to a printer magnification correction mode "2" in Step S521 and to skip to the stand-by loop which starts from Step S502. Then, the transfer paper sheet carrying the test chart printed thereon is set on the glass plate 202 of the original table in the reader section 101. The test chart used in the printer magnification correction caries a test pattern image of the type which is the same as that used in the scanner magnification correction. Thus, a plurality of test charts are available for the printer magnification correcting operation, for selection through the operating/display section. Any error or variation in the reading magnification in the reader section 101 has been eliminated already through the described process based on the scanner magnification correction value m and the pixel number PN.

When the "mode 2" of the printer magnification correction mode has been selected through Steps S504, S518 and S519 after the start of the magnification correction (S503), the control section 104 operates to reset the scanner unit 204 to the home position HP in Step S522. The process then proceeds to Step S523, in which the test chart image on the transfer paper sheet placed on the glass plate 202 of the original table is read and stored in the image memory 307.

The control section 104 then operates to find points on the image stored in the image memory 307 where a change of brightness level occurs in the image reading (sub-scanning) direction, thereby determining the number of pixels from the home position HP to the image reading start position SP (S532), the number of pixels from the image reading start position SP to the image leading end position LE (S524) and the number of pixels from the image reading start position SP to the image tail end position TE (S525). Then, Step S526 is executed, in which the previously set numbers of pixels between the image reading start position to the image leading and tail end positions are compared with the pixel numbers determined in Steps S524 and S525, whereby image reading magnitude Mp is determined in the same manner as in the scanner magnification correcting operation described before. The term corresponding to the difference from the real size is then determined as the printer magnification correction value mp to be used in the correction of the printer magnification in the direction of the sub-scanning.

The process then advances to Step S527 in which the timing of start of image recording, i.e., the timing of start of feed of the transfer paper sheet to the transfer section 215 (register timing), is determined based on the number of pixels between the image reading start position SP and the image leading end position LE and based also on the velocity of feed of the transfer paper sheet. The value mp of correction of the magnification in the printer as determined in Step S526 and the image recording start timing TM as determined in Step S527 are stored in the non-volatile memory 318 in Step S528.

Then, after the magnification correction mode is turned off in Step S529, the process returns to the stand-by loop which starts from Step S502.

The value m of magnification correction in the sub-scanning direction and the image reading start position PN in regard to the scanner, as well as the value mp of magnification correction in the sub-scanning direction and the image recording start timing TM in regard to the printer, are stored in the non-volatile memory 318 through the described process.

The search for the change in the image signal level is typically conducted on the image signals which are located in the central region of the test chart as viewed in the direction of the main scanning. However, the search may be effected on image signals corresponding to both end regions of the test chart so that any slanting or skew of the scanner unit 204 can be detected.

In operation, the demanded magnification MQ entered through the operating/display section 105, e.g., a demanded scanning magnitude or a demanded copying magnitude, is corrected in accordance with the correction values stored in the non-volatile image 318, so that image scanning, printing and copying can be conducted exactly at the demanded magnification.

A description will now be given of the operations of various sections or portions of the multi-function copying machine.

Figure 6:
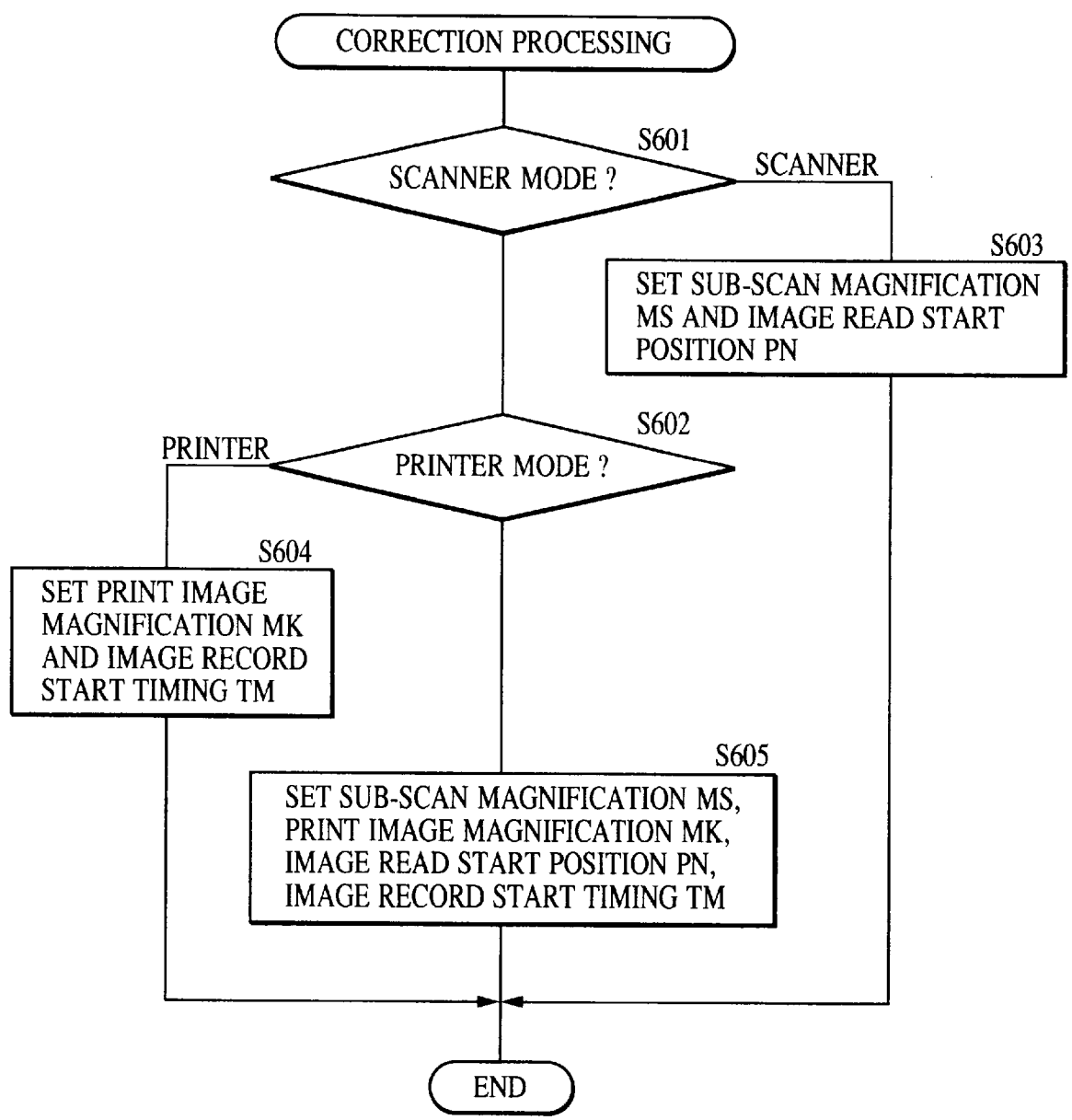
FIG. 6 is a flow chart illustrative of a magnification correcting processing executed in the copying machine shown in FIG. 1.

FIG. 6 is a flow chart showing the magnification correcting processing performed by the control section 104.

As stated before, the multi-function copying machine has three modes of operation which can be selectively used: a copying mode in which an original image read in the reader section 101 is printed by the printer section 102, a scanner mode in which image signals representing the original image read in the reader section 101 are delivered to the facsimile interface 108 or the computer interface 111, and a printer mode in which the printer section 102 performs printing of an image in accordance with image signals received from the facsimile interface 108 or the computer interface 111.

Figure 7:
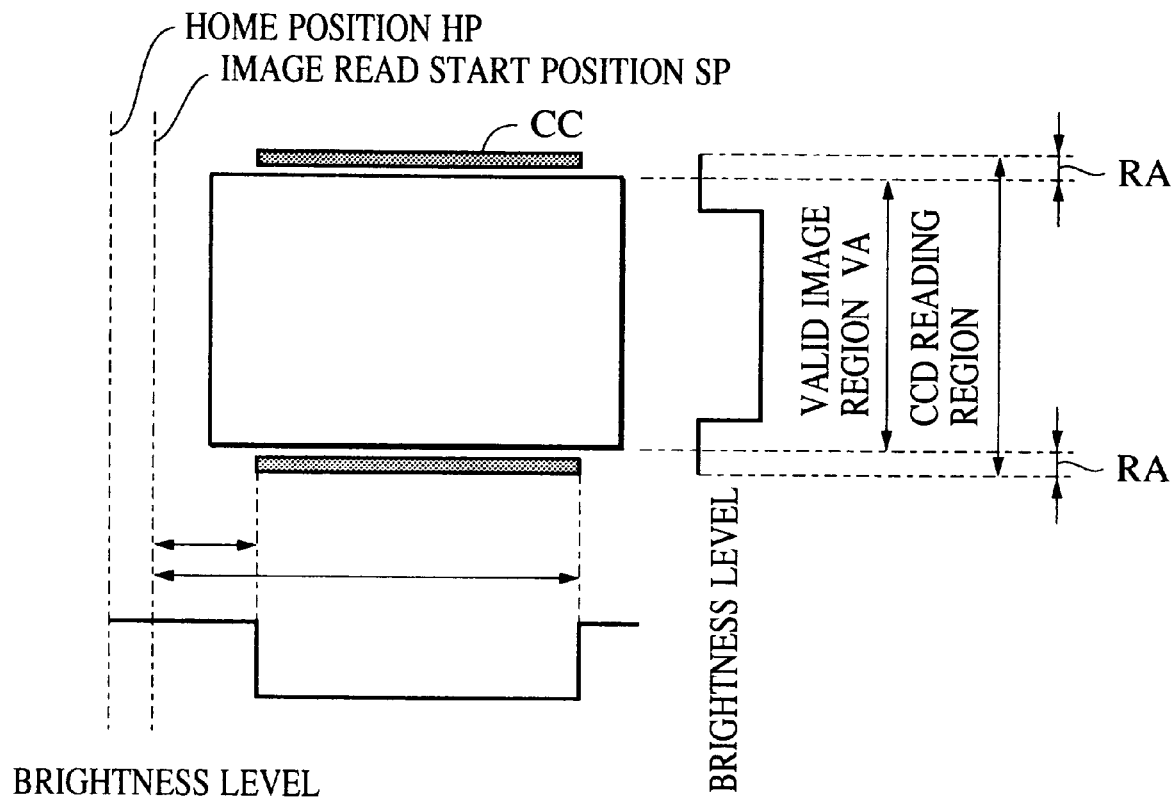
FIGS. 7 and 8 are illustrations of another example of the magnification correction test chart used in the copying machine shown in FIG. 1.
Figure 8:
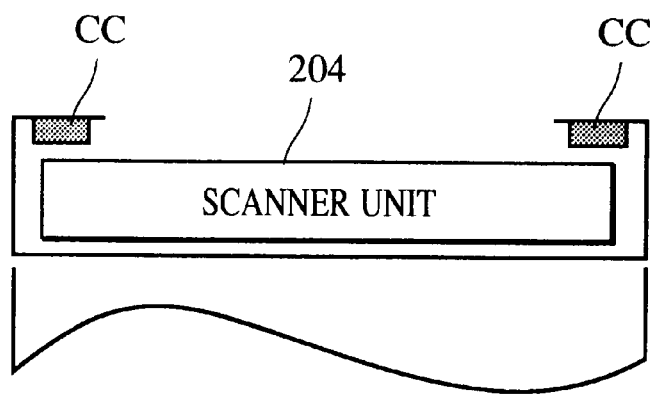
Figure 9:
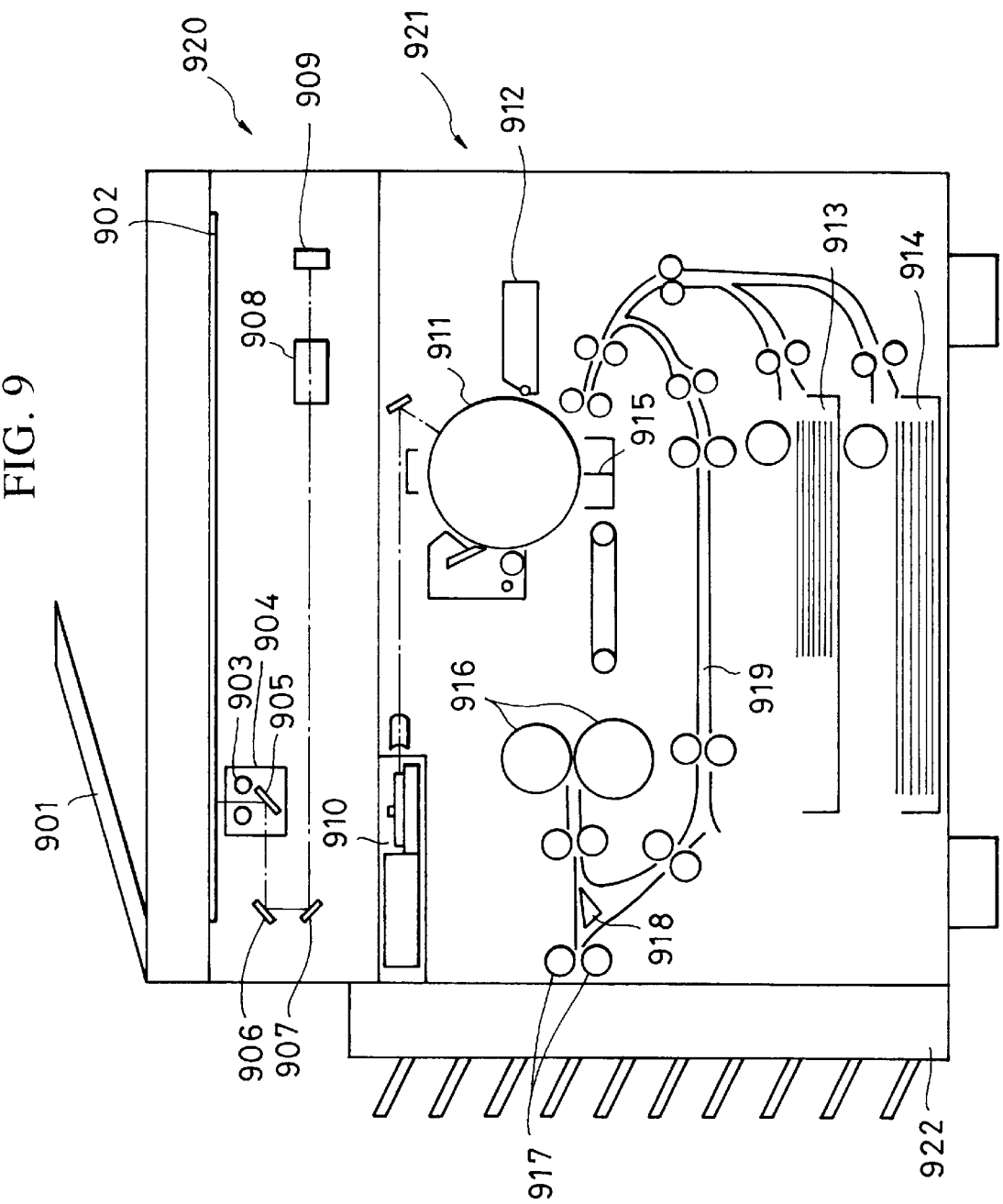
FIG. 9 is a schematic illustration of the construction of a conventional copying machine.
Figure 10:
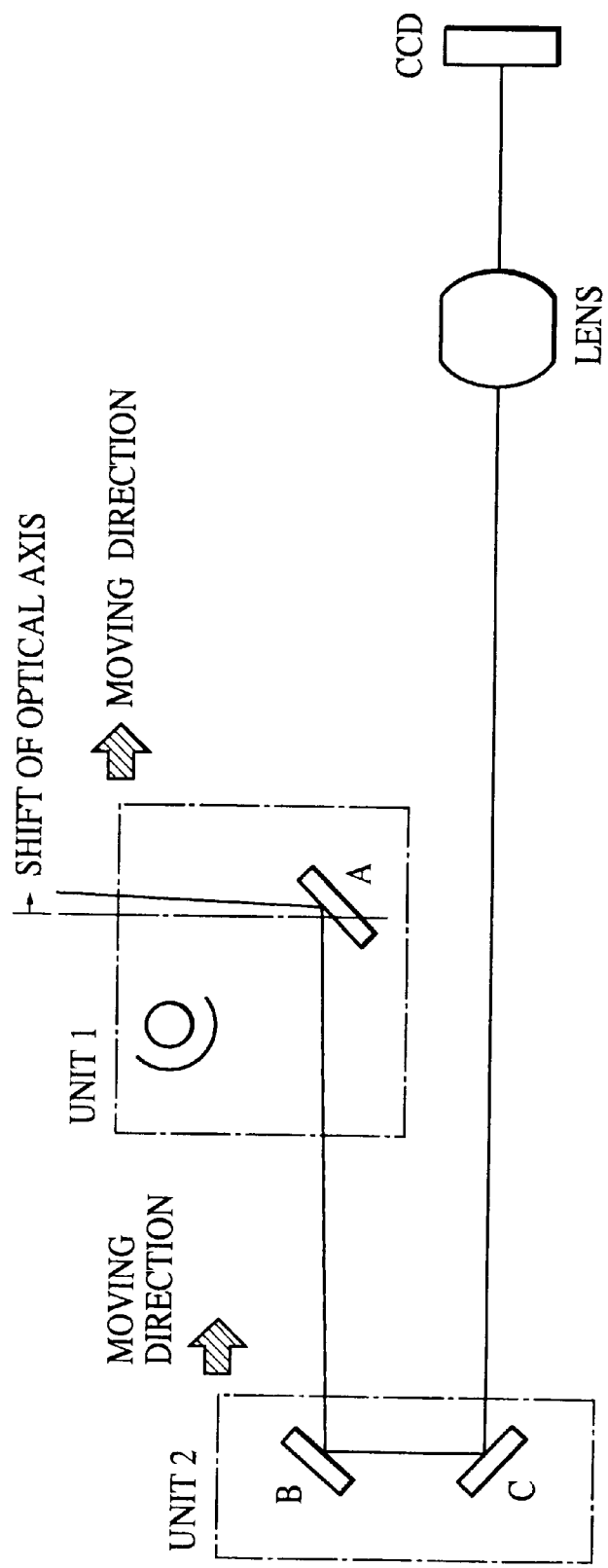
FIGS. 10 and 11 are illustrations showing the manner in which optical axis is shifted in accordance with a movement of a scanner unit.
Figure 11:
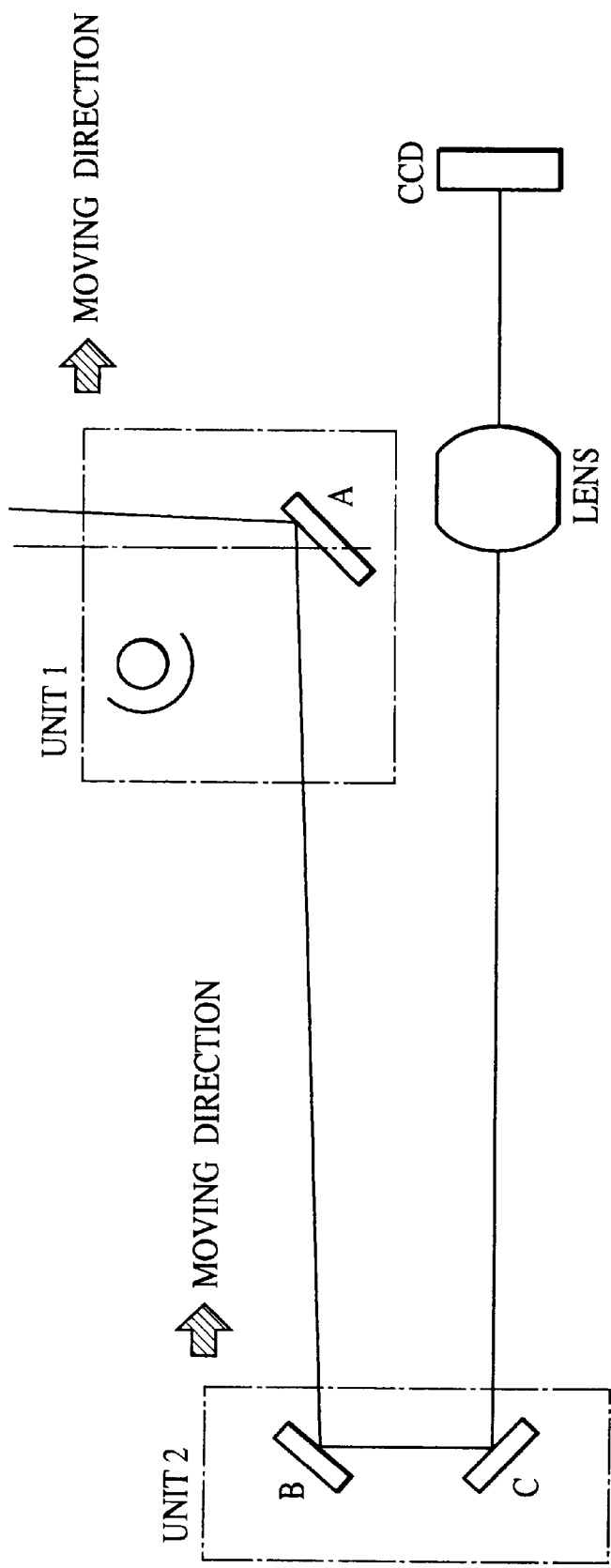

Prior to the operation of the copying machine, various values shown in FIG. 7 which are to be used in the magnification correction are set by the control section 104.

More specifically, the operation mode of the copying machine to be used is determined through Steps S601 and Step S602. If the operation mode is the scanner mode, the sub-scanning direction image magnitude MS is determined based on the demanded magnification MQ and the scanner magnification correction value m in regard to the sub-scanning direction, in accordance with the following condition:

MS=MQ/(1+m)

The control section 104 then sets the speed of the motor 317 for moving the scanner unit 204 such that the sub-scanning of the original image is performed exactly at the velocity corresponding to the above-mentioned sub-scanning direction image magnitude MS. Subsequently, in Step S603, the pixel number PN indicating the image reading start position is set in such a manner as to correct the position where the reading of image by the CCD image sensor 209 is to be started.

If the selected operation mode is the printer mode, a print image magnification MK is determined based on the demanded magnification MQ and the printer magnification correction value mp in regard to the sub-scanning direction, in accordance with the following equation:

MK=MQ/(1+mp)

In Step S604, the above-mentioned print image magnification MK is set in the sub-scanning magnification changing circuit 320 so that a magnification control processing is effected on the image signals received through the facsimile interface 108 or the computer interface 111 in accordance with the print image magnification K. At the same time, the record start timing TM is set so as to correct the timing at which the recording of the image is to be started.

When the mode is the copy mode, rather than the scanner mode or the printer mode, the process proceeds to Step S605 in which a copying magnification MC is determined based on the demanded magnitude MQ, scanner magnification correction value m and the printer magnification correction value mp in regard to the sub-scan direction, in accordance with the following equation:

MC=MQ/{(1+m)×(1+mp)}

The operation speed of the motor 317 for moving the scanner unit 204 is set such that the original image is sub-scanned at the velocity corresponding to the thus determined copying magnitude MC. At the same time, the number PN of pixels concerning the image reading start position and the recording start timing TM are set so as to correct the position where the reading of image by the CCD image sensor 209 is to be started and the timing at which the recording of the image is to be started.

Thus, in the illustrated embodiment of the present invention, correction of the image magnification and correction of position where the reading or recording is to be started are effected in the direction of the sub-scanning in accordance with the selected mode of operation of the copying machine, by using correcting factors stored in the non-volatile memory 318, such as the magnification correction values m and Mp, pixel number NP and the recording start timing TM.

In the described embodiment, correction of magnification in regard to the scanner is conducted by using a test chart placed on the glass plate 202 of the reader section 101. This, however, is not exclusive and the same advantage as that offered by the described embodiment can be obtained by using magnification correction charts CC which are attached to guide rails for guiding the scanner unit 204 so as to be read by reading areas RA of the CCD image sensor 209 which are out of the valid image area VA.

The use of the magnification correction charts CC attached to the guide rails disposed along both ends of the scanner unit 204 enables detection of any slanting or skew of the scanner unit which may take place during the sub-scanning movement of the scanner unit. It will be seen that such a slanting or skew can be found by detecting the numbers of pixels between the image reading start position and the image leading end position for the correction charts CC on both guide rails and comparing these numbers with each other.

As will be understood from the foregoing description, correction of image magnification in regard to the scanner section and the correction of image magnification in regard to the printer section are automatically carried out through the use of test charts or test chart data, so that a greater tolerance is afforded for manual adjustment of the optical system. Consequently, image magnification can be highly precisely adjusted even at sites such as user's offices where special jigs and tools are not available.

Although in the described embodiment the magnification correction in the sub-scanning direction in the scanner mode and the copying mode is achieved through correcting the velocity of the sub-scanning performed by the scanner unit, the same effect can be obtained by executing a magnification adjusting processing on the image signals in regard to the sub-scanning direction, instead of controlling the sub-scanning velocity.

The magnification correction in the sub-scanning direction in printing mode and copying mode may be effected by other suitable method such as a control of speed of rotation of a drum-type photosensitive member.

Although the invention has been described through its preferred forms, it is to be understood that the described embodiment is only illustrative and various changes and modifications can be imparted thereto without departing from the scope of the invention which is limited solely by the appended claims.

What is claimed is:

1. An image processing apparatus, comprising:
   reading means for reading an original image, beginning at a reading position, at an image reading magnification;
   magnification detecting means for detecting the image reading magnification and an image reading offset of said reading means based on image signals obtained through reading of a predetermined image by said reading means; and
   correcting means for correcting, in accordance with the image reading magnification detected by said magnification detecting means, the image reading magnification of said reading means and for adjusting, in accordance with both the image reading offset and the image reading magnification detected by said magnification detecting means, the reading position where the reading of the original image by said reading means is to be started.

2. An image processing apparatus according to claim 1, wherein said correcting means corrects the speed of reading of the original image performed by said reading means.

3. An image processing apparatus according to claim 1, wherein said reading means includes a main scanning means which electrically performs main scanning of the original image and a sub-scanning means which mechanically performs sub-scanning of the original image.

4. An image processing apparatus according to claim 3, wherein said detecting means detects the image reading magnification in the direction of the sub-scanning.

5. An image processing apparatus according to claim 3, wherein said correcting means corrects the image reading magnification in the direction of the sub-scanning.

6. An image processing apparatus according to claim 1, wherein said reading means includes a light source arranged to illuminate the original image at the reading position, an image sensor for reading the original image by means of the light reflected by the original image, and a mirror for directing the light reflected by the original image to said image sensor.

7. An image processing apparatus according to claim 1, wherein said correcting means corrects the image reading magnification of said reading means, based on a difference between the image reading magnification detected by said detecting means and a predetermined image reading magnification.

8. An image processing method comprising:
   a reading step for reading a predetermined image, beginning at a reading position;
   a detecting step for detecting an image reading magnification and an image reading offset based on image signals obtained in said reading step;
   a correcting step for correcting a magnification at which an original image is read, in accordance with the image reading magnification detected in said detecting step; and
   an adjusting step for adjusting the reading position where the reading of the original image is to be started, in accordance with both the image reading offset and the image reading magnification detected in said detecting step.

9. An image processing method according to claim 8, wherein said correcting step includes a step of correcting the speed of reading of the original image.

10. An image processing method according to claim 9, wherein said correcting step includes steps of comparing the detected image reading magnification with a predetermined image reading magnification, and of correcting the image reading magnification in reading of the original image, based on a difference between the detected image reading magnification and the predetermined image reading magnification.

11. An image processing apparatus, comprising:
    recording means for recording an image in accordance with image signals;
    detecting means for detecting an image recording magnification of said recording means based on a predetermined record image recorded by said recording means; and
    correcting means for correcting, based on the image recording magnification detected by said detecting means, the image recording magnification of said recording means.

12. An image processing apparatus according to claim 11, wherein said correcting means effects a magnification changing processing on image signals supplied to said recording means.

13. An image processing apparatus according to claim 11, wherein said correcting means further corrects timing at which recording of an image by said recording means is to be started.

14. An image processing apparatus according to claim 11, further comprising image reading means, wherein said predetermined image recorded by said recording means is read by said image reading means and said detecting means detects the image recording magnification based on image signals obtained through reading of said predetermined image performed by said image reading means.

15. An image processing apparatus according to claim 11, wherein said correcting means corrects the image recording magnification of said recording means, based on a difference between the image recording magnification detected by said detecting means and a predetermined image recording magnification.

16. An image processing method comprising:
    a recording step in which a predetermined image is recorded in accordance with image signals by a recording device;
    a scanning step in which the recorded predetermined image is scanned;
    a detecting step in which an image recording magnification of the recording device is detected based on the scanned recorded predetermined image; and
    a correcting step in which the image recording magnification at which the recording device will record a subsequent image is corrected based on the detected image recording magnification.

17. An image processing method according to claim 16, wherein said correcting step includes a step of effecting a magnification changing processing on image signals which are to be used in recording the subsequent image.

18. An image processing method according to claim 16, wherein said correcting step is performed based on a difference between the image recording magnification detected in said detecting step and a predetermined image recording magnification.

19. An image processing apparatus, comprising:
    reading means for reading an original image, at a reading magnification;
    recording means for recording the read original image, at a recording magnification, based on image signals obtained through reading of the original image by said reading means;
    magnification detecting means for detecting a net image magnification based on image signals obtained through reading of a predetermined image by said reading means and reading of a predetermined image recorded by said recording means; and
    correcting means for correcting, based on the image magnification, the reading magnification of said reading means and/or the recording magnification of said image recording means.

20. An image processing apparatus according to claim 19, wherein said correcting means conducts a correction of the speed of reading of the original image performed by said reading means and/or a magnification changing processing on image signals to be delivered to said recording means.

21. An image processing apparatus according to claim 19, wherein said reading means includes a main scanning means which electrically performs main scanning of the original image and a sub-scanning means which mechanically performs sub-scanning of the original image.

22. An image processing apparatus according to claim 21, wherein said correcting means performs correction of the reading magnification and/or the recording magnification in the direction of the sub-scanning.

23. An image processing apparatus according to claim 19, wherein said correcting means includes means for comparing the detected net image magnification and a predetermined image magnification, and means for correcting the reading magnification and/or the recording magnification based on a difference between the detected net image magnification and the predetermined image magnification.

24. An image processing method comprising:
   a first step of reading a first predetermined image;
   a second step of detecting an image reading magnification based on read signals obtained through reading of the first predetermined image;
   a third step of recording a second predetermined image;
   a fourth step of reading the recorded second predetermined image;
   a fifth step of detecting an image recording magnification based on read signals obtained through reading of the second predetermined image; and
   a sixth step of correcting the image reading magnification and/or the image recording magnification in accordance with the detected image reading magnification and/or the detected image recording magnification.

25. An image processing method according to claim 24, wherein said sixth step includes performing a correction of the speed of reading of the original image and/or a magnification changing processing on image signals to be used for image recording.

26. An image processing method according to claim 24, wherein said sixth step performs said correction based on a difference between a predetermined magnification and the detected image reading magnification and/or the detected image recording magnification.

* * * * *